United States Patent [19]
Lee et al.

[11] Patent Number: 5,973,139
[45] Date of Patent: Oct. 26, 1999

[54] CARBOXYLATED CELLULOSE ESTERS

[75] Inventors: Benedict Moonsang Lee; Chung-Ming Kuo; Jessica Posey-Dowty, all of Kingsport; Larry Gerald Curtis, Johnson City, all of Tenn.

[73] Assignee: Eastman Chemical Company, Kingsport, Tenn.

[21] Appl. No.: 09/019,554

[22] Filed: Feb. 6, 1998

[51] Int. Cl.$^6$ .............................. C08B 3/00; C08B 3/16; C08L 1/04; C08L 1/08

[52] U.S. Cl. .................. 536/63; 106/162.7; 106/162.71; 106/162.72; 106/168.01; 106/171.1; 536/64; 536/65; 536/68; 536/71; 536/76

[58] Field of Search .................................. 536/63, 64, 65, 536/68, 69, 70, 71, 76; 106/162.7, 162.71, 162.72, 168.01, 171.1

[56] References Cited

U.S. PATENT DOCUMENTS

| | | | |
|---|---|---|---|
| 2,768,161 | 10/1956 | Malm et al. | 260/225 |
| 2,856,400 | 10/1958 | Malm et al. | 260/225 |
| 4,166,809 | 9/1979 | Brewer et al. | 260/16 |
| 4,590,265 | 5/1986 | Bogan et al. | 536/63 |
| 5,142,034 | 8/1992 | Bellas et al. | 536/58 |
| 5,292,876 | 3/1994 | Simmons | 536/63 |
| 5,349,026 | 9/1994 | Emmons et al. | 525/328.6 |
| 5,371,207 | 12/1994 | Zhuang | 536/58 |
| 5,594,068 | 1/1997 | Buchanan et al. | 525/54.3 |
| 5,610,233 | 3/1997 | Sharma | 525/54.21 |

FOREIGN PATENT DOCUMENTS

| | | |
|---|---|---|
| 0 138 703 | 4/1985 | European Pat. Off. . |
| 93/25584 | 12/1993 | WIPO . |

OTHER PUBLICATIONS

Walker, K.R. *Polym. Paint Colour J.*, vol. 177(4182): 12–16, 1987.

Document No. 239017, Date Mar. 10, 1984, Research, Disclosure Anonymous.

I.D. Sand, "The Properties and Applications of Ozonolyzed Cellulose Acetate Butyrate," Polymer Material Science Engineering, 1987, pp. 57–63.

M. Broder et al., "A Statistically Designed Experiment for the Study of a Silver Automotive Basecoast," Journal of Coatings Technology, vol. 60, No. 766, pp. 27–32, Nov. 1968.

J. Meister in "Circulation Reduces Specular Reflectance of Metallic Automotive Points," *Polymers,* 38(2), pp. 638–639, Sep. 1997.

*Primary Examiner*—Howard C. Lee

[57] ABSTRACT

A process for preparing a carboxylated cellulose ester from oxidized cellulose is described. The carboxylated cellulose esters have improved solvent solubility and coating resin compatibility when compared to cellulose esters made from regular grade cellulose. The process comprises activating the oxidized cellulose with water. The activated oxidized cellulose is then dehydrated by displacing the water with acetic acid and optionally displacing at least some of the acetic acid with butyric acid or propionic acid. After dehydration the activated cellulose is reacted with an esterifying reagent in the presence of a catalyst at about 0° C. The temperature is gradually increased to a level sufficient to complete reaction and to obtain an intrinsic viscosity ranging from about 0.2 to about 1.6 dl/g. The reacted solution is then hydrolyzed to obtain a hydroxyl content ranging from about 0.05 to about 1.0. The catalyst is neutralized with a neutralizing agent and the solution is optionally filtered and the carboxylated cellulose ester is then precipitated with a precipitating agent. The invention also relates to carboxylated cellulose esters prepared by the process described above as well as high solids coating compositions containing carboxylated cellulose esters made by the above process.

24 Claims, No Drawings

CARBOXYLATED CELLULOSE ESTERS

FIELD OF THE INVENTION

The invention relates to a process for preparing a carboxylated cellulose ester from oxidized cellulose. Carboxylated cellulose esters of the invention may be formulated into coating compositions having a very high solids content, i.e., greater than 45%. A carboxylated cellulose ester prepared by the process of the invention exhibits improved compatibility with coating resins and is soluble in a wider range of solvents than conventional cellulose esters.

BACKGROUND OF THE INVENTION

Cellulose esters are used in various applications such as filter tow, pharmaceutical coatings, ink compositions, molded articles and industrial coatings. Thus, methods for their economical preparation are clearly desirable. Coating compositions employing ordinary cellulose esters frequently exhibit relatively low solids contents, i.e., the compositions require excessive amounts of solvents which present difficulties with regard to drying time, solvent evaporation and other environmental concerns. Although, solvent borne cellulose esters may provide desirable properties to coatings, recent trends toward lowering the volatile organic compound (VOC) of coating formulations have reduced the use of solvents, and thereby solvent-borne cellulose esters. Further, ordinary cellulose esters exhibit limited compatibility with some classes of polymeric materials.

One way to improve the compatibility of cellulose esters is to add carboxylic acid groups to the cellulose ester. A process for carboxylating cellulose ester has been described by I. D. Sand in "The Properties and Applications of Ozonolyzed Cellulose Acetate Butyrate," Polymer Material Science Engineering, 1987, pp. 57–63. In this process the hydroxyl groups of cellulose acetate butyrate are oxidized in the presence of ozone to produce an oxidized or carboxylated cellulose acetate butyrate. According to Sand, carboxylated cellulose acetate butyrates have a lower molecular weight than conventional non-carboxylated cellulose acetate butyrates. As a result, the carboxylated cellulose acetate butyrates are soluble in a broader range of solvents and are compatible with a wider range of resins than the conventional cellulose acetate butyrates. Unfortunately, however, in addition to the carboxyl group, the ozone treatment described by Sand also generates peroxide, aldehyde and ketone functional groups in the cellulose ester.

Similarly, European Patent Application No. 138,703 describes a process for preparing carboxylated cellulose esters by reacting a cellulose ester with ozone. However, like the process described by Sand, in the process described by this European Patent Application, peroxide, aldehyde, and ketone functional groups are generated in the cellulose esters in addition to the carboxyl group.

Thus, there remains a need to develop cellulose esters which can be formulated into high solid coating compositions satisfying current VOC requirements, while maintaining solvent solubility and coating resin compatibility. The carboxylated cellulose esters of the invention answer this need.

SUMMARY OF THE INVENTION

It has surprisingly been discovered that when a carboxylated cellulose ester is prepared from oxidized cellulose, the carboxylated cellulose ester can be formulated into high solids coating compositions and exhibit improved solvent solubility and coating resin compatibility. Accordingly, the invention relates to a process for making carboxylated cellulose esters from oxidized cellulose.

In the process of the invention, oxidized cellulose is activated with water. The activated oxidized cellulose is then dehydrated by displacing the water with acetic acid and optionally displacing at least some of the acetic acid with butyric acid or propionic acid. After dehydration, the activated cellulose is reacted with an esterifying reagent in the presence of a catalyst at an initial temperature of about 0° C. The temperature is gradually increased to a level sufficient to complete reaction and to obtain an intrinsic viscosity ranging from about 0.2 to about 1.6 dl/g. The reacted solution is then hydrolyzed to obtain a hydroxyl content ranging from about 0.05 to about 1.0. The catalyst is neutralized with a neutralizing agent and the solution is optionally filtered. The carboxylated cellulose ester is then precipitated with a precipitating agent.

The invention also relates to a carboxylated cellulose ester obtained by the process described above. Such carboxylated cellulose esters can be formulated into coating compositions having a high solids content, preferably, greater than 45%. In addition to having improved solvent solubility and coating resin compatibility, the carboxylated cellulose ester made by the process of the invention is an excellent pigment dispersing agent and provides rheology control in metal flake coating.

In another embodiment, the invention relates to pigment dispersions, metal and wood coating compositions and ink compositions comprising carboxylated cellulose esters prepared by the above process. The invention also relates to substrates coated with the carboxylated cellulose ester prepared by the above process.

Additional objects and advantages of the invention are discussed in the detailed description which follows, and will be obvious from that description, or may be learned by practice of the invention. It is to be understood that both this summary and the following detailed description are exemplary and explanatory only and are not intended to restrict the invention.

DETAILED DESCRIPTION OF THE INVENTION

The invention relates to a process for making a carboxylated cellulose ester from oxidized cellulose. Carboxylated cellulose esters which may be prepared by the invention include, for example, carboxylated cellulose acetate, carboxylated cellulose acetate butyrate and carboxylated cellulose acetate propionate.

Any oxidized cellulose starting material may be used to prepare the carboxylated cellulose esters of the invention. For example, oxidized cellulose starting material for use in the process of the invention can be obtained from Rayonier in Jesup, Ga. Alternatively, the oxidized cellulose may be formed by oxidizing cellulose materials by conventional methods which are well known in the art. For example, cellulose materials can be bleached with an oxidizing agent, such as, hypochlorite. Preferably, the carboxyl content of the oxidized cellulose materials is at least about 30 meq/kg, more preferably, ranging from about 47 to about 77 meq/kg.

In the process of the invention, oxidized cellulose is activated with water, preferably with demineralized water. Generally, oxidized cellulose is available in sheet form which can be broken into small thin pieces and activated by soaking in water. Once the pieces are completely swollen, they may be further broken down into smaller pieces in a blender, such as, for example, an EBERBACH® industrial blender.

The water-activated oxidized cellulose is then dehydrated by washing with acetic acid in order to displace the water with acetic acid. Depending upon the desired cellulose ester, the water activated cellulose may be further washed with butyric acid or propionic acid in order to displace the acetic acid with butyric or propionic acid, thereby obtaining cellulose acetate butyrate or cellulose acetate propionate respectively. If the desired carboxylated cellulose ester is cellulose acetate, the activated cellulose is washed only with acetic acid.

After the dehydration step, the activated cellulose is reacted with an esterifying reagent in the presence of a catalyst at an initial temperature of about 0° C. The esterifying reagent is selected from acetic acid, propionic acid, butyric acid, their anhydrides, and mixtures thereof. The esterifying reagent is present in an amount ranging from about 10.0 moles to about 3.0 mole relative to one mole of the anhydroglucose unit of the cellulose. The selection of the esterifying reagent is governed by the desired carboxylated cellulose ester. For example, if cellulose acetate is desired, the esterifying reagent may be acetic acid and/or acetic anhydride. Similarly, if cellulose acetate butyrate is desired, the esterifying reagent may be a mixture of acetic acid and/or acetic anhydride and butyric acid and/or butyric anhydrides. When a mixture of esterifying reagents is used, the preferred amount of acetic acid or anhydride ranges from about 0.1 to 3.0 moles and the preferred amount of butyric acid or propionic acid or anhydrides thereof ranges from about 0.6 to about 6.0 moles.

In the esterification step, when carboxylated cellulose acetate butyrate is the desired cellulose ester, the degree of substitution of butyryl groups may range from about 0.5 to about 2.95 and the degree of substitution of acetyl groups may range from about 0.4 to about 2.95. Similarly, when carboxylated cellulose acetate propionate is desired, the degree of substitution of propyl groups may range from about 0.5 to about 2.95 and the degree of substitution of acetyl groups may range from about 0.4 to about 2.95. Preferably, in the carboxylated cellulose acetate butyrates and propionates according to the invention, the degree of substitution of propionate or butyrate ranges from about 1 to about 2.5 and the preferred degree of substitution of acetate ranges from about 0.4 to about 1.6. Carboxylated cellulose acetates prepared by the above process generally have a degree of substitution of acetyl groups ranging from about 2.0 to about 2.95.

Suitable catalysts useful in the process of the invention include esterification catalysts known in the art. Sulfuric acid is preferred, but other catalysts such as perchloric acid, zinc chloride, titanium alkoxides, sulfate salts, sulfamic acid, methane sulfonic acid or mixtures thereof may also be used.

Preferably the intrinsic viscosity of a carboxylated cellulose ester obtained from the process of the invention ranges from about 0.2 to about 1.6, more preferably, from about 0.2 to about 0.9 dl/g. The preferred intrinsic viscosity is obtained by adjusting the reaction time and temperature. For example, the initial reaction temperature is maintained at about 0° C. The temperature is then gradually increased to a level sufficient to complete reaction and to obtain the desired viscosity.

After the activated cellulose is reacted, the esterified carboxylated cellulose may be hydrolyzed to obtain a degree of substitution of hydroxyl groups which preferably ranges from about 0.05 to about 1.0. The rate of hydrolysis may be controlled by temperature and catalyst concentration with higher temperatures and catalyst concentrations increasing the rate of hydrolysis. Preferred hydrolysis reactions can be performed with a 90:10 acetic acid/water mixture in the presence of acid catalyst at temperatures ranging from about 30° C. to about 70° C. The extent of hydrolysis may also be increased by adding more acetic acid/water mixture in sequential steps.

When the desired degree of substitution of the hydroxyl group in the carboxylated cellulose ester is achieved, hydrolysis is stopped by neutralizing the catalyst in the solution from the reaction step. Methods for monitoring the degree of substitution of hydroxyl groups are known in the art and include, for example, IR, NMR, and pyrolysis gas chromatography. The neutralizing agent can be any basic component. Examples of suitable neutralizing agents include, but are not limited to, magnesium acetate, calcium acetate, sodium acetate, pyridine or mixtures thereof. The period of time to achieve the desired degree of substitution may be predetermined by methods known in the art.

Once the desired degree of hydrolysis is reached, the solution may be filtered by methods known in the art. Filtration, however, is not always necessary. The carboxylated cellulose ester is then precipitated from the reaction solution by conventional methods known in the art. A preferred precipitating agent for precipitating the carboxylated cellulose ester is an aqueous acetic acid, more preferably a 10% acetic acid solution. For carboxylated cellulose esters having a high degree of substitution of hydroxyl groups, water soluble alcohols such as methanol, isopropanol, and ethanol help facilitate precipitation if the ester is not soluble in it. The preferred alcohol is isopropanol. If desired, the carboxylated cellulose ester may then be purified by washing with water to remove other acids and salts. Optionally, the carboxylated cellulose ester may be dried, for example, to obtain a powder.

In another embodiment, the invention relates to various carboxylated cellulose esters made by the process described above. Such carboxylated cellulose esters include, for example, carboxylated cellulose acetate, carboxylated cellulose acetate butyrate, carboxylated cellulose acetate propionate, carboxylated cellulose propionate butyrate and carboxylated cellulose acetate propionate butyrate. Preferred carboxylated cellulose esters include, for example, carboxylated cellulose acetate, carboxylated cellulose acetate butyrate and carboxylated cellulose acetate propionate.

Carboxylated cellulose acetates made by the above described process have a degree of substitution of hydroxyl groups ranging from about 0.05 to about 1.0, a degree of substitution of acetyl groups ranging from about 2.0 to about 2.95 and an intrinsic viscosity ranging from about 0.2 to about 1.6 dl/g, more preferably, from about 0.2 to about 0.9 dl/g.

Carboxylated cellulose acetate propionates made by the process according to the invention have a degree of substitution of hydroxyl groups ranging from about 0.05 to about 1.0; a degree of substitution of propyl groups ranging from about 0.5 to about 2.95; a degree of substitution of acetyl groups ranging from about 0.4 to about 2.95; and an intrinsic viscosity ranging from about 0.2 to about 1.6 dl/g, more preferably, from about 0.2 to about 0.9 dl/g.

Carboxylated cellulose acetate butyrates prepared by the process according to the invention have a degree of substitution of hydroxyl groups ranging from about 0.05 to about 1.0; a degree of substitution of butyryl groups ranging from about 0.5 to about 2.95; a degree of substitution of acetyl groups ranging from about 0.4 to about 2.95; and an intrinsic viscosity ranging from about 0.2 to about 1.6 dl/g, more preferably, from about 0.2 to about 0.9 dl/g.

Preferably the carboxylated cellulose acetate propionates and/or butyrates prepared according to the invention have a degree of substitution of propionate or butyrate which ranges from about 1 to about 2.5 and a preferred degree of substitution of acetate which ranges from about 0.4 to about 1.6.

The carboxylated cellulose esters obtained by the above described process can be used in a variety of coating compositions such as architectural coatings, maintenance coatings, industrial coatings, automotive coatings, textile coatings, inks, adhesives, and coatings for metal, paper, wood, and plastics. Accordingly, the invention relates to such coating compositions comprising a carboxylated cellulose ester of the invention. The carboxylated cellulose esters of the invention may be incorporated into those coating compositions in the same manner as known cellulose esters and are used with the conventional components and or additives of such compositions. The coating compositions may be clear or pigmented. Coating compositions containing carboxylated cellulose esters are known in the art and are described, for example, in European Patent Application No. 138,703, the disclosure of which is herein incorporated by reference.

A coating composition according to the invention may comprise water, a solvent, a pigment (organic or inorganic) and/or other additives and fillers known in the art. Such additives or fillers include, but are not limited to, leveling, rheology, and flow control agents such as silicones, fluorocarbons, urethanes, or cellulosic; extenders; reactive coalescing aids such as those described in U.S. Pat. No. 5,349,026, the disclosure of which is herein incorporated by reference; flatting agents; pigment wetting and dispersing agents and surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; plasticizers, curing agents; or coalescing agents. Specific examples of such additives can be found in *Raw Materials Index*, published by the National Paint & Coatings Association, 1500 Rhode Island Avenue, N.W., Washington, D.C. 20005, the disclosure of which is herein incorporated by reference.

The carboxylated cellulose esters obtained by the above described process can be used to make coating formulations having very high solids content. Indeed, coating formulations with a solids content of greater than 45% may be obtained. Further, the carboxylated cellulose esters obtained by the above described process exhibit improved compatibility with resin coatings and solubility in a wider range of coating solvents.

A carboxylated cellulose ester prepared by the process of the invention is compatible with a number of solvents. These solvents include, but are not limited to methanol; methylene chloride; diacetone alcohol; lower alkanoic acids, such as formic acid, acetic acid, and propionic acid; lower alkyl ketones, such as acetone, methyl ethyl ketone, methyl propyl ketone, methyl isobutyl ketone, and methyl n-amyl ketone; esters, such as methyl acetate, ethyl acetate, isopropyl acetate, n-propyl acetate, n-butyl acetate, 2-ethylhexyl acetate, isobutyl acetate, 2-butoxy-ethyl acetate, 1-methoxy-2-propyl acetate, 2-ethoxy-ethyl acetate, ethyl-3-ethoxypropionate, isobutyl isobutyrate, and 2,2,4-trimethyl-1,3-pentanediol monoisobutyrate; ethers such as ethylene glycol butyl ether, propylene glycol propyl ether, 2-ethoxyethanol, 2-propoxyethanol, and 2-butoxyethanol, and mixtures thereof. Also, mixtures of solvents, such as mixtures of toluene and/or xylene with ethanol and mixtures of ethanol with esters, such as ethyl acetate, 1-methoxy-2-propyl acetate and the like may be used. Of course, the above listing is not intended to be exhaustive, but is indicative of the variety of solvents which may be employed in conjunction with the carboxylated cellulose esters of the invention.

The carboxylated cellulose esters made by the process of the invention are compatible with a wide range of resinous materials such as those used in coating and ink compositions. Classes of resins with which the carboxylated cellulose esters are compatible include, but are not limited to, thermoplastic acrylics, thermoset acrylics, silicone resins, alkyd resins, ordinary cellulose esters, urea formaldehyde resins, melamine resins, urethanes, nitrocellulose, unsaturated and other thermosetting polyester resins.

A coating formulation containing the carboxylated cellulose ester of the invention may be applied to a variety of surfaces, substrates, or articles, e.g., paper; plastic; metal; such as steel and aluminum; wood; gypsum board; concrete; brick; masonry; or galvanized sheeting. The type of surface, substrate, or article to be coated generally determines the type of coating formulation used. The coating formulation may be applied using means known in the art. For example, a coating formulation may be applied by spraying, brushing, rolling or any other application method to coat a substrate.

In metallic coatings, the solids level of the formulation significantly influences the metal flake orientation, which is manifested by observing the coating at different angles of illumination and monitoring the change in apparent brightness, commonly referred to as "flop." As the solids level increases, the flake orientation becomes more random causing an uneven luster and appearance. Typical metallic coating formulations require approximately from about 20 to about 30 percent of carboxylated cellulose ester to achieve a satisfactory metal flake orientation. However, a carboxylated cellulose ester of the invention can be formulated into metallic coating compositions containing as little as 5 percent, based on the resin solids, of carboxylated cellulose ester and still having satisfactory metal flake orientation. Thus, another embodiment of the invention relates to a metal coating composition comprising from about 5% to about 30% of a carboxylated cellulose ester made by the process according to the invention and from about 30% to about 70% of a film-forming materials.

A carboxylated cellulose ester of the invention is also useful as a major film-forming component in both curing and non-curing finishes of wood coatings. Accordingly, the invention also relates to curing type wood finishes comprising from about 10 percent by weight of a carboxylated cellulose ester prepared by the process of the invention, about 20 percent by weight of an alkyd resin, about 2 to about 5 percent by weight of a melamine resin, about 5 to about 7.5 percent by weight of a urea formaldehyde resin, a relatively small amount of a silicone resin and a solvent system comprising suitable solvents such as xylene, toluene, ethanol, n-butyl alcohol, and methyl ethyl ketone. Flatting agents, such as SYLOID® 83 and SYLOID® 378 may also be employed.

A carboxylated cellulose ester prepared by the process according to the invention can be formulated into ink formulations. Here, the carboxylated cellulose ester functions as a medium to disperse the pigments for the ink and also serve as a major film-forming resin. Thus, another embodiment of the invention relates to ink compositions comprising from about 30 to about 70% by weight of a carboxylated cellulose ester, from about 30 to about 70% by weight of an ink pigment and a solvent present in an amount effective to provide a viscosity suitable for applying the ink composition under the desired conditions. The carboxylated cellulose ester is preferably selected from carboxylated cellulose acetate, carboxylated cellulose acetate butyrate, carboxylated cellulose acetate propionate or a mixture thereof. Preferably, the ink composition of the invention comprises 45 to 70% by weight of at least one carboxylated cellulose ester prepared by the process according to the invention.

Ink compositions of the invention may also contain common ink additives depending on need of a particular ink or printing method. Such ink additives include, but are not limited to wetting agents, leveling agents, rheology additives, additives to promote resolubility/rewet on the press, coalescing aids, pigment wetting agents, dispersing agents, surfactants, waxes, defoaming agents, antifoaming agents, and modifying polymers.

The concentration of the pigment depends upon the particular pigment employed and the color and degree of hiding desired in the ink composition. Pigments which are useful in the ink compositions of the invention are those well known in the art and are described, for example, in *Kirk-Othmer Encyclopedia of Chemical Technology,* 2d Ed., Vol. 11, pp. 613–615, the disclosure of which is herein incorporated by reference. The solvents useful in the ink compositions of the invention are also well known in the art and are described, for example, in *Kirk-Othmer Encyclopedia of Chemical Technology,* 2d Ed., Vol. 11, pp. 621–623, the disclosure of which is herein incorporated by reference. Preferred solvents include ethanol, ethyl acetate, isopropanol, diacetone alcohol, ethylene glycol monoethyl ether, ethylene glycol monobutyl ether, and mixtures thereof.

As a further aspect, a carboxylated cellulose ester prepared by the process according to the invention is useful as a pigment dispersing agent. Methods for dispersing pigments are known in the art and taught, for example, in European Patent Application No. 138,703, the disclosure of which is herein incorporated by reference. In one type of conventional dispersion, a carboxylated cellulose ester, such as carboxylated cellulose acetate butyrate, is blended with an organic or inorganic pigment, and the mixture is then processed in suitable apparatus, such as a two-roll mill. During processing, frictional heat and/or heat provided from an external source causes the carboxylated cellulose ester to soften and subsequently disperse the pigment. In this manner, expensive pigments can be easily dispersed in coating formulations, thereby providing high coloring power and good transparency while using a minimal amount of the pigment.

Other methods of dispersing pigments, include, but are not limited to, solution methods, ball mill, pebble mill, Kady mill, and sand mill. In these methods, the carboxylated cellulose ester is dissolved in a suitable solvent, pigment is added, and the mixture is mixed in a mill for up to 48 hours. The resulting solution dispersion can be used to disperse pigments in lacquers, inks, automotive coatings, etc. Accordingly, the invention also relates to a method for dispersing a pigment comprising disolving a carboxylated cellulose ester made by the process described above in a solvent and adding a pigment to the carboxylated cellulose ester/solvent mixture. Preferably, the weight ratio of the pigment to the carboxylated cellulose ester ranges from about 20:80 to about 60:40. The pigment and carboxylated cellulose ester/solvent mixture are mixed under conditions sufficient to disperse the pigment.

Typical pigments used with a carboxylated cellulose ester obtained by the process according to the invention include perylenes, quinacridones, phthalocyanines, iron oxides, and carbon blacks. The wide compatibility of carboxylated cellulose esters prepared by the process of the invention allows the above described pigment dispersions to be used with a wide variety of polymers, thus making the dispersions useful in many paint and ink formulations.

The practice of the invention is disclosed in the following examples, which should not be construed to limit the invention in any way.

EXAMPLES

Solubility of cellulose acetate butyrates were determined by dissolving the ester in coatings solvents such as methyl isobutyl ketone (MIBK), methyl n-amyl ketone (MAK), n-butyl acetate, ethylene glycol butyl ether (EASTMAN® EB), ethyl-3-ethoxypropionate (EASTMAN® EEP), propylene glycol propyl ether (PP), isobutyl isobutyrate (EASTMAN® IBIB), 2,2,4-trimethyl-1,3-pentanediol monoisobutyrate. (TEXANOL®), a ketone mixture (EASTMAN® C-11), an aromatic and olefinic solvent mixture (AROMATIC 100 and 150), 2-ethylhexyl acetate, and n-propyl acetate. These solubilities were compared with those of commercial non-carboxylated cellulose esters CAB381-2BP, CAB381-0.1, CAB381-0.5, CAB321-1, CAB321-0.1, CAB171-15S and CAB531-1 available from Eastman Chemical Company. Compatibilities of cellulose acetate butyrate with coatings alkyd resins such as CARGIL 74-7455 and CARGIL 052-7711 available from McWorter, formerly known as Cargill, Inc., of Carpentersville, Ill., and polyisocyanate (Bayer's DESMODUR HL) were also determined. Some of the cellulose acetate butyrate samples were tested for the application of original equipment manufacturer (OEM) metallic basecoating. A few formulations were prepared for spray application trials on metal plates. The sprayed metal plates were subjectively rated for metal flake orientation and appearance.

Example 1

A 20-gram sample of an oxidized cellulose containing 77 meq/kg carboxyl groups was broken into small pieces, and soaked in demineralized water overnight. The soaked cellulose was broken into smaller pieces by processing the material in an EBERBACH® industrial blender. After draining the water using a suction glass filter, the water-activated oxidized cellulose was washed with acetic acid a few times, and then with butyric acid a few times.

The esterifying reagent was prepared by mixing 47 grams of butyric acid including the residual amount with the water-activated oxidized cellulose, 6.2 grams of acetic anhydride, and 50.6 grams of butyric anhydride. As a catalyst, 0.68 gram of 8% sulfuric acid was added. The esterifying reagent and catalyst were added to the water-activated oxidized cellulose and put in a round bottom flask with a stirrer. The flask was put in an ice bath which kept the bath temperature at approximately 0° C. After keeping the water bath temperature approximately at 0° C. for 4 hours, the bath temperature was raised gradually to room temperature, and finally raised to 50° C. to complete the esterification reaction. A mixture of 19 grams of acetic acid and 19 grams of water was added to the solution and the bath temperature was raised to 60° C. for hydrolysis. When the desired degree of hydrolysis was achieved, the catalyst in the solution was neutralized by adding 1.5 grams of magnesium acetate dissolved in aqueous acetic acid solution. The solution was filtered and then precipitated in a 10 percent aqueous acetic acid solution and dried. This cellulose ester is referred to as Sample No. 1. Analytical test results are shown in Table 1.

TABLE 1

|  | Sample No. 1 |
| --- | --- |
| Carboxyl Content (meq/kg) | 96.6 |
| Molecular Weight | |
| Mw | 41084 |
| Mn | 7654 |
| Mz | 91029 |
| DS* Acetyl Group | 0.53 |
| DS Butyryl Group | 2.30 |
| DS Hydroxyl Group | 0.17 |
| DS butyryl/DS acetyl Ratio | 4.33 |
| I.V. | 0.53 |

*DS = degree of substitution

To determine the compatibility of this carboxylated cellulose ester with CARGIL 74-7455 alkyd compound, three samples were prepared in which the carboxylated cellulose ester and the CARGIL 74-7455 were dissolved in MIBK at various ratios as set forth in Table 2. The total solids level in the solution was kept approximately at 10 percent. The compatibility was determined by the clearness of the dried film of these mixtures on a glass plate. The results are set forth in Table 2.

TABLE 2

| Example | CAB (gr.) | Alkyd (gr.) | MIBK (gr.) | CAB/Alkyd Ratio | Results C = Clear; H = Hazy |
| --- | --- | --- | --- | --- | --- |
| A | 0.5 | 2.14 | 4.5 | 1:3 | C |
| B | 1.0 | 1.43 | 9.0 | 1:1 | C |
| C | 1.5 | 0.83 | 13.5 | 3:1 | C |

These results show that the carboxylated cellulose acetate butyrate (CAB) made from the oxidized cellulose was compatible with the CARGIL 74-7455 alkyd resin.

Example 2

A carboxylated cellulose ester was made with 20 grams of the same oxidized cellulose used in Example 1. The process was similar to that described in Example 1, but the esterifying reagent was prepared by mixing 80 grams of butyric acid including the residual amount with the cellulose, 8.3 grams of acetic anhydride, and 62.7 grams of butyric anhydride. The reaction bath temperature was maintained at 0° C. for 2 hours, and then raised gradually to 35° C. The rest of the process steps were the same as those in Example 1. This cellulose ester is referred to as Sample No. 2.

A cellulose acetate butyrate made by using a PLACETATE F® regular grade cellulose by following the same process as the above sample made from oxidized cellulose. The solution, after neutralization, was filtered through a medium glass frit filter to remove excessive amount of fibers. This cellulose ester is referred to as Sample No. 3.

The analytical results of these two cellulose acetate butyrates are given in Table 3.

TABLE 3

| Molecular Weight | Sample No. 2 | Sample No. 3 |
| --- | --- | --- |
| Mw | 185307 | 85752 |
| Mn | 11959 | 12137 |
| Mz | 779213 | 517788 |
| DS Acetyl Group | 0.45 | 0.51 |
| DS Butyryl Group | 2.25 | 2.42 |
| DS Hydroxyl Group | 0.30 | 0.07 |
| DS butyryl/DS acetyl Ratio | 5.00 | 4.75 |
| I.V. | 0.69 | 0.72 |

Sample No. 2, made from oxidized cellulose, showed good compatibility with the alkyds, but Sample No. 3, made from regular grade cellulose, was incompatible with the alkyds based on the observation of cast films of the mixtures in MIBK solvent.

Example 3

A carboxylated cellulose acetate butyrate was prepared by using the same oxidized cellulose as in Example 1. One hundred fifty grams of the oxidized cellulose was reacted with an esterifying reagent composed of 352.5 grams of butyric acid (total), 46.5 grams of acetic anhydride, 379.5 grams of butyric anhydride. As a catalyst, 6.18 grams of 98 percent sulfuric acid was added. The reaction was kept approximately at 0° C. for 5 hours, and then the temperature was gradually raised to 40° C. to complete esterification. After esterification was completed, a mixture of 142.5 grams of acetic acid and 142.5 grams of water was added for hydrolysis. Hydrolysis was performed at 60° C. for 15 hours. The solution was filtered through a coarse glass frit filter and precipitated in a 10 percent acetic acid solution. This cellulose ester is referred to as Sample No. 4. The analytical results of this carboxylated cellulose ester are given in Table 4.

TABLE 4

|  | Sample No. 4 |
| --- | --- |
| Carboxyl Content (meq/kg) | 53.6 |
| Molecular Weight | |
| Mw | 54187 |
| Mn | 14695 |
| Mz | 115187 |
| DS Acetyl Group | 0.46 |
| DS Butyryl Group | 2.32 |
| DS Hydroxyl Group | 0.22 |
| DS butyryl/DS acetyl Ratio | 4.74 |
| I.V. | 0.87 |

The solubility of the Sample No. 4 carboxylated cellulose ester was determined by dissolving the carboxylated cellulose ester in commonly-used organic coatings solvents. Solubilities of Sample No. 4 and CAB531-1, a commercially available non-carboxylated cellulose acetate butyrate were compared. The results are set forth in Table 5.

TABLE 5

| Solvents | Sample No. 4 | Commercial CAB 531-1 |
|---|---|---|
| EASTMAN ® EB | S | I |
| EASTMAN ® EEP | S | S |
| PP* | S | I |
| EASTMAN ® IBIB | S | PS |
| TEXANOL ® | S | S |
| EASTMAN ® C-11 ketone | S | S |
| AROMATIC 150 | I | I |
| 2-ethylhexyl acetate | S | S |
| n-propyl acetate | S | S |
| n-butyl acetate | S | S |
| EASTMAN ® MAK | S | S |

I: Insoluble, S: Soluble, PS: Partially Soluble.
*Propylene glycol propyl ether.

As shown in Table 5, the Sample 4 carboxylated cellulose ester made from oxidized cellulose was readily soluble in EASTMAN® EB, EASTMAN® IBIB, propylene glycol propyl ether (PP), however, CAB531-1 was not soluble in EASTMAN® EB or PP and was only partially soluble in EASTMAN® IBIB.

Example 4

Carboxylated cellulose ester were prepared as in Example 1, except that the mole ratio of acetic and butyric anhydride in the esterifying reagent was changed from 1:5 to 1:4, but the total amount was kept at 1.9 moles. The hydrolysis conditions were also changed for these samples to increase the DS hydroxyl numbers. These cellulose ester are referred to as Samples No. 5 and No. 6. The hydrolysis conditions of these samples are set forth in Table 6.

TABLE 6

| | Sample No. 5 | Sample No. 6 |
|---|---|---|
| Hydrolysis 1: | | |
| Acetic acid/Water | 142 g/142 g | 142 g/142 g |
| Temperature | 55° C. | 55° C. |
| Duration | 1.5 hrs. | 15.0 hrs. |
| Hydrolysis 2: | | |
| Acetic acid/Water | none | 60 g/60 g |
| Temperature | | 65° C. |
| Duration | | 4.0 hrs. |

After hydrolysis, the solutions were filtered through a coarse glass frit filter and precipitated in a 10 percent acetic acid solution. The carboxylated cellulose esters were washed thoroughly and dried. The analytical results of these carboxylated cellulose esters are set forth in Table 7.

TABLE 7

| | Sample No. 5 | Sample No. 6 |
|---|---|---|
| Carboxyl content (meq/kg) | 57.5 | 43.0 |
| Molecular Weight | | |
| Mw | 33895 | 29573 |
| Mn | 10013 | 8514 |
| Mz | 75619 | 68097 |
| DS Acetyl group | 0.53 | 0.59 |
| DS Butyryl group | 2.21 | 2.13 |
| DS Hydroxyl group | 0.26 | 0.28 |

TABLE 7-continued

| | Sample No. 5 | Sample No. 6 |
|---|---|---|
| DS butyryl/DS acetyl Ratio | 4.17 | 3.61 |
| I.V. | 0.55 | 0.51 |

The solubilities of Samples No. 5 and No. 6 were determined by dissolving the carboxylated cellulose esters in commonly-used organic coatings solvents. Solubility in organic solvents of these carboxylated cellulose esters revealed that they were more readily soluble in a wider range of solvents than commercial non-carboxylated cellulose esters. The solubility of the carboxylated cellulose esters of Samples No. 5 and 6 were compared with commercially availably non-carboxylated cellulose acetate butyrate, CAB 531-1. The results are set forth in Table 8.

TABLE 8

| Solvents | Sample No. 5 | Sample No. 6 | Commercial CAB 531-1 |
|---|---|---|---|
| EASTMAN ® EB | S | S | I |
| EASTMAN ® EEP | S | S | S |
| PP* | S | S | I |
| EASTMAN ® IBIB | S | S | PS |
| TEXANOL ® | S | S | S |
| EASTMAN ® C-11 ketone | S | S | S |
| AROMATIC 150 | I | I | I |
| 2-ethylhexyl acetate | PS | S | S |
| n-propyl acetate | S | S | S |
| n-butyl acetate | S | S | S |
| EASTMAN ® MAK | S | S | S |

I: Insoluble, S: Soluble, PS: Partially Soluble.
*Propylene glycol propyl ether.

As shown in Table 8, the cellulose acetate butyrates made from oxidized cellulose were readily soluble in EASTMAN® EB, EASTMAN® IBIB, propylene glycol propyl ether (PP), whereas the commercial non-carboxylated CAB 531-1 was not soluble in EASTMAN® IBIB or PP and was only partially soluble in EASTMAN® IBIB.

Example 5

In this example, basecoat formulations were prepared using the carboxylated cellulose esters of Sample Nos. 5 and 6 and various commercially available cellulose acetate butyrates. The formulations comprised coatings polyester, cellulose ester, melamine such as RESIMENE 755® available from Monsanto Chemical Company, SILBERLINE® 5245 (65% aluminum flake and 35% mineral spirits), PTSA (p-toluene sulfonic acid) catalyst, and a combination of coatings solvents. The specific formulations are set forth in Table 9.

TABLE 9

| Component | Sample No. 5 | Commercial CAB381-2BP | Commercial CAB321-0.1 | Commercial CAB381-0.1 |
|---|---|---|---|---|
| Polyester Resin (wt %): | | | | |
| 70% solids in NPG/TMP/IPA/AD | 35.71 | 29.85 | 31.79 | 29.73 |
| Cellulosic (wt %): | | | | |
| 27.3% solids in n-butylacetate | 15.13 | | 13.79 | 12.60 |
| 30.0% solids in n-butylacetate | | 10.16 | | |
| Melamine (wt %): | | | | |
| RESIMINE ® 755 (100% solids) | 12.22 | 9.14 | 11.12 | 10.17 |
| Aluminum Flake (wt %): | | | | |
| SILBERLINE ® 5245AR (65% solids) | 11.44 | 8.33 | 10.13 | 9.52 |
| Catalyst (wt %): | | | | |
| PTSA (50% solids in butanol) | 0.77 | 0.45 | 0.70 | 0.64 |
| Solvents (wt %): | | | | |
| n-butylacetate/xylene (60/40) | 2.21 | 5.15 | 11.45 | 1.84 |
| n-butylacetate/butanol (85/15) | | 36.92 | 21.02 | 4.00 |
| EASTMAN ® MAK | 21.04 | | | 29.67 |
| AROMATIC 100 | 1.48 | | | 1.23 |
| Total | 100.00 | 100.00 | 100.00 | 100.00 |
| Calculated solids (wt %) | 49.18 | 38.45 | 44.06 | 40.94 |

These formulations were sprayed on metal plates which were dried in an oven. The sprayed panels were subjectively judged by experts for appearance and metal flake orientation by methods known in the art and described by J. Meister in "Circulation Reduces Specular Reflectance of Metallic Automotive Points," *Polymers*, 38(2), pp. 638–639, Sept.1997. The evaluation results of Sample No. 5 and commercial cellulose acetate butyrate are given in Table 10.

TABLE 10

| Ranking | Cellulose Ester | Solids Level (%) |
|---|---|---|
| 1 | Sample No. 5 | 49.18 |
| 2 | CAB381-2BP | 38.45 |
| 3 | CAB321-0.1 | 44.06 |
| 4 | CAB381-0.1 | 40.94 |

The evaluation revealed that using the carboxylated cellulose ester of Sample 5 instead of comparable commercial cellulose acetate butyrate resulted in a 27.8% increase in the solids level, with a total solids level of 49.2%, and improved sprayed panel performance. This increase in solids level is clearly beneficial since a higher solids level is required to reduce the amount of volatile organic compounds (VOC) during the spraying operation.

Example 6

A carboxylated cellulose ester was prepared from 100 grams of the same oxidized cellulose used in Example 1. The mole ratio of acetic anhydride and butyric anhydride was changed to approximately 3:1, instead of the 1:4 ratio used in Example 4. The esterifying reagent was made with 235.0 grams of butyric acid, 141.7 grams of acetic anhydride, and 73.0 grams of butyric anhydride and 3.45 grams of 98 percent sulfuric acid. The initial water bath temperature was kept at approximately 0° C., and gradually increased to 65° C. over a period of 6.5 hours. The hydrolysis was performed in two steps by adding the first mixture of 142 g/142 g, acetic acid/water solution, and after 16 hours of hydrolysis at 55° C., adding the second mixture of 60 g/60 g, acetic acid/water solution, and running for 4 more hours. The remaining steps were similar to those of previous samples. This cellulose ester is referred to as Sample No. 7. The analytical results of these samples are set forth in Table 11.

TABLE 11

| | Sample No. 7 |
|---|---|
| Carboxyl content (meq/kg) | 31.7 |
| Molecular Weight | |
| Mw | 14119 |
| Mn | 5586 |
| Mz | 30002 |
| DS Acetyl group | 1.56 |
| DS Butyryl group | 1.11 |
| DS Hydroxyl group | 0.33 |
| DS butyryl/DS acetyl Ratio | 0.71 |
| I.V. | 0.30 |

The solubility of the carboxylated cellulose ester of Sample No. 7 was determined by dissolving the carboxylated cellulose ester in commonly-used organic coatings solvents. The results are shown in the Table 12, including the solubilities of three commercial non-carboxylated cellulose esters having similar properties.

TABLE 12

| Solvents | Sample No. 7 | Commercial CAB171-15S | Commercial CAB321-1 | Commercial CAB381-0.5 |
|---|---|---|---|---|
| EASTMAN ® EB | PS | I | I | I |
| EASTMAN ® | S | I | I | S |

TABLE 12-continued

| Solvents | Sample No. 7 | Commercial CAB171-15S | Commercial CAB321-1 | Commercial CAB381-0.5 |
|---|---|---|---|---|
| EEP |  |  |  |  |
| PP* | S | I | I | I |
| EASTMAN ® IBIB | I | I | I | I |
| TEXANOL ® | PS | I | I | I |
| EASTMAN ® C-11 | I | I | I | I |
| AROMATIC 150 | I | I | I | I |
| 2-ethylhexyl acetate | I | I | I | I |
| n-propyl acetate | S | S | S | S |
| n-butyl acetate | S | I | S | S |
| EASTMAN ® MAK | S | I | S | S |

I: Insoluble, S: Soluble, PS: Partially Soluble.
*Propylene glycol propyl ether.

The carboxylated cellulose ester of Sample No. 7 made from oxidized cellulose was readily soluble in EASTMAN® EEP, propylene glycol propyl ether (PP), n-butyl acetate, and EASTMAN® MAK whereas the commercial cellulose acetate esters having similar compositions were not soluble in some of the same organic solvents.

As shown in these examples, these carboxylated cellulose acetate butyrates could be made in various combinations of DS acetyl/DS butyryl ratios, I.V.s, and carboxyl contents without changing their performance characteristics in organic solvent solubility and alkyds compatibility when compared with the commercial cellulose acetate butyrates. These examples demonstrate that the addition of the carboxylated cellulose acetate butyrate to the metallic coatings formulations increased the solids level, while maintaining a satisfactory performance in the metallic flake orientation and appearance. The above exemplified coatings formulations were prepared with polyester resins, but similar performance is expected in acrylic resin formulations.

What is claimed is:

1. A process for making a carboxylated cellulose ester from oxidized cellulose comprising the following steps:
   (1) activating the oxidized cellulose with water;
   (2) dehydrating the activated oxidized cellulose by displacing the water with acetic acid and optionally displacing at least some of the acetic acid with butyric acid or propionic acid;
   (3) reacting the activated cellulose with an esterifying reagent in the presence of a catalyst at a temperature of about 0° C.;
   (4) gradually increasing the temperature to a level sufficient to complete the esterification of the oxidized cellulose to obtain a carboxylated cellulose ester with an intrinsic viscosity ranging from 0.2 to about 1.6 dl/g;
   (5) hydrolyzing the carboxylated cellulose ester to obtain a degree of substitution of hydroxyl groups ranging from about 0.05 to about 1.0;
   (6) neutralizing the catalyst with a neutralizing agent;
   (7) optionally filtering the solution; and
   (8) precipitating the solution with a precipitating agent to precipitate the carboxylated cellulose ester.

2. A process according to claim 1, wherein the esterifying reagent is selected from the group consisting of acetic acid, propionic acid, butyric acid, acetic anhydride, propionic anhydride, butyric anhydride and a mixture thereof.

3. A process according to claim 1, wherein the esterifying reagent is present in an amount ranging from about 10.0 moles to about 3.0 mole relative to one mole of anhydroglucose unit of the cellulose.

4. A process according to claim 1, wherein the carboxylated cellulose ester is carboxylated cellulose acetate.

5. A process according to claim 1, wherein:
   (a) the carboxylated cellulose ester is carboxylated cellulose acetate butyrate;
   (b) the acetic acid is displaced with at least some butyric acid; and
   (c) the esterifying reagent comprises from about 0.1 to about 3 moles of acetic anhydride and from about 6.0 to about 0.6 moles of butyric anhydride.

6. A process according to claim 1, wherein:
   (a) the carboxylated cellulose ester is carboxylated cellulose acetate propionate;
   (b) the acetic acid is displaced with at least some propionic acid; and
   (c) the esterifying reagent comprises from about 0.1 to about 3 moles of acetic anhydride and from about 6.0 to about 0.1 moles of propionic anhydride.

7. A process according to claim 1, wherein the catalyst is selected from the group consisting of sulfuric acid, perchloric acid, zinc chloride, a titanium alkoxide, a sulfate salt, sulfamic acid, methane sulfonic acid and a mixture thereof and wherein the neutralizing agent is selected from the group consisting of magnesium acetate, calcium acetate, sodium acetate, pyridine and a mixture thereof.

8. A process according to claim 1, wherein the intrinsic viscosity ranges from about 0.2 to about 0.9 dl/g and wherein the degree of substitution of hydroxyl groups ranges from about 0.05 to about 1.0.

9. A process according to claim 1, wherein the oxidized cellulose has a carboxyl content of at least 30 meq/kg.

10. A process according to claim 13, wherein the oxidized cellulose has a carboxyl content ranging from about 47 to about 77 meq/kg.

11. A carboxylated cellulose acetate butyrate prepared by the process according to claim 5, having a degree of substitution of hydroxyl groups ranging from about 0.05 to about 1.0; a degree of substitution of butyryl groups ranging from about 0.5 to about 2.95; a degree of substitution of acetyl groups ranging from about 0.5 to about 2.95; and an intrinsic viscosity ranging from about 0.2 to about 1.6 dl/g.

12. A carboxylated cellulose acetate propionate prepared by the process according to claim 6, having a degree of substitution of hydroxyl groups ranging from about 0.05 to about 1.0; a degree of substitution of propyl groups ranging from about 0.5 to about 2.95; a degree of substitution of acetyl groups ranging from about 0.5 to about 2.95; and an intrinsic viscosity ranging from about 0.2 to about 1.6 dl/g.

13. A carboxylated cellulose acetate prepared by the process according to claim 4, having a degree of substitution of hydroxyl groups ranging from about 0.05 to about 1.0; a degree of substitution of acetyl groups ranging from about 2.0 to about 2.95; and an intrinsic viscosity ranging from about 0.2 to about 1.6 dl/g.

14. A coating composition comprising a carboxylated cellulose ester prepared by the process according to claim 1.

15. A coating composition according to claim 14, wherein the coating composition is a metal coating composition, an ink composition, a textile coating composition or an adhesive composition.

16. A coating composition according to claim 15, wherein the solids content is at least about 45% by weight.

17. A coating composition according to claim 16, wherein the coating composition is a metal coating composition comprising from about 5 to 30% by weight of said carboxylated cellulose ester and from about 30 to 70% by weight of a film forming material.

18. A metal coating composition according to claim 17, further comprising an additive selected from the group consisting of a leveling agent, a rheology agent, a flow control agent, a flatting agent, a wetting agent, a dispersing agent, an ultraviolet (UV) absorbers, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a curing agent, a coalescing agent, and mixtures thereof.

19. A metal coating composition according to claim 18, wherein the carboxylated cellulose ester is selected from the group consisting of a carboxylated cellulose acetate, a carboxylated cellulose acetate butyrate, a carboxylated cellulose acetate propionate, or a mixture thereof.

20. A coating composition according to claim 16, wherein the coating composition is an ink composition comprising:
   (i) from about 30 to about 70% by weight of said carboxylated cellulose ester;
   (ii) from about 30 to about 70% by weight of an ink pigment; and
   (iii) a solvent present in an amount effective to provide a viscosity suitable for applying an ink composition.

21. An ink composition according to claim 20, wherein the solvent is selected from the group consisting of ethanol, ethyl acetate, isopropanol, diacetone alcohol, ethylene glycol monoethyl ether, ethylene glycol monobutyl ether, and mixtures thereof.

22. An ink composition according to claim 20, further comprising an additive selected from the group consisting of a wetting agent, a leveling agent, a rheology agent, a coalescing aid, a wetting agent, a dispersing agent, a surfactant, a wax, a defoaming agent, an antifoaming agent, a modifying polymer, and mixtures thereof.

23. A method for dispersing a pigment comprising the following steps:
   (i) dissolving the carboxylated cellulose ester made by the process according to claim 1 in a solvent;
   (ii) adding a pigment to the carboxylated cellulose ester/solvent mixture; and
   (iii) mixing the pigment/carboxylated cellulose ester/solvent mixture under conditions sufficient to disperse said pigment.

24. A pigment dispersion made by the process according to claim 23, wherein the weight ratio of the pigment to the carboxylated cellulose ester ranges from about 20:80 to about 60:40.

* * * * *